United States Patent
Ruan et al.

(10) Patent No.: US 11,034,276 B2
(45) Date of Patent: Jun. 15, 2021

(54) AUXILIARY CONVEY MECHANISM FOR GOODS IN A VEHICLE COMPARTMENT

(71) Applicant: ZheJiang TOPSUN Logistic Control Co., Ltd., Zhejiang (CN)

(72) Inventors: Buqin Ruan, Zhejiang (CN); Zhaoyin Xiao, Zhejiang (CN)

(73) Assignee: ZheJiang TOPSUN Logistic Control Co., Ltd., Taizhou (CN)

( * ) Notice: Subject to any disclaimer, the term of this patent is extended or adjusted under 35 U.S.C. 154(b) by 146 days.

(21) Appl. No.: 16/480,311

(22) PCT Filed: Aug. 18, 2017

(86) PCT No.: PCT/CN2017/097965
§ 371 (c)(1),
(2) Date: Jul. 24, 2019

(87) PCT Pub. No.: WO2018/137338
PCT Pub. Date: Aug. 2, 2018

(65) Prior Publication Data
US 2020/0039414 A1 Feb. 6, 2020

(30) Foreign Application Priority Data
Jan. 24, 2017 (CN) .......................... 201710060321.4

(51) Int. Cl.
*B65D 90/00* (2006.01)
*B60P 1/52* (2006.01)
(Continued)

(52) U.S. Cl.
CPC ............ *B60P 1/52* (2013.01); *B65D 90/0033* (2013.01); *B65D 88/129* (2013.01);
(Continued)

(58) Field of Classification Search
CPC ..... B65D 88/546; B65D 90/0033; B60P 1/52; B65G 67/00; B65G 13/12; B65G 13/11
See application file for complete search history.

(56) References Cited

U.S. PATENT DOCUMENTS

2004/0247422 A1 12/2004 Neumann et al.
2012/0141241 A1 6/2012 Kordel et al.

FOREIGN PATENT DOCUMENTS

CN 2876023 Y 3/2007
CN 102910103 A 2/2013
(Continued)

OTHER PUBLICATIONS

International Search Report of PCT/CN2017/097965.

*Primary Examiner* — Saul Rodriguez
*Assistant Examiner* — Willie W Berry, Jr.
(74) *Attorney, Agent, or Firm* — Minder Law Group; Willy H. Wong (57) ABSTRACT

An auxiliary convey mechanism for goods in a vehicle compartment, comprising a plurality of splice plates, a plurality of surface boards, a plurality of support frames, a plurality of conveying assemblies and a plurality of avoidance gaps. Each of the conveying assemblies comprises a lifting frame and rollers. Avoidance gaps are formed between two adjacent support frames of the support frames along a length direction of a surface board of the surface boards. Each of the conveying assemblies is disposed in each of the support frames, and each of the surface boards is bent along a width direction of the surface board to have a corrugated shape. The auxiliary convey mechanism for goods in the vehicle compartment has higher structural stability while without occupying the transport space of a truck.

20 Claims, 9 Drawing Sheets

(51) Int. Cl.
*B65D 88/12* (2006.01)
*B65D 88/54* (2006.01)
*B65G 13/12* (2006.01)
*B65G 69/22* (2006.01)

(52) U.S. Cl.
CPC ............ *B65D 88/546* (2013.01); *B65G 13/12* (2013.01); *B65G 69/22* (2013.01)

(56) References Cited

FOREIGN PATENT DOCUMENTS

| | | | |
|---|---|---|---|
| CN | 106740376 A | 5/2017 | |
| DE | 10014990 A1 | 10/2001 | |
| JP | 2000109177 A | 4/2000 | |

AUXILIARY CONVEY MECHANISM FOR GOODS IN A VEHICLE COMPARTMENT

RELATED APPLICATIONS

This application is a national stage entry of International Application No. PCT/CN2017/097965 filed Aug. 18, 2017, and claims benefit of Chinese Patent Application No. CN201710060321.4 filed Jan. 24, 2017.

The above applications and all patents, patent applications, articles, books, specifications, other publications, documents, and things referenced herein are hereby incorporated herein in their entirety for all purposes. To the extent of any inconsistency or conflict in the definition or use of a term between any of the incorporated publications, documents, or things and the text of the present document, the definition or use of the term in the present document shall prevail.

BACKGROUND OF THE INVENTION

Field of Invention

The present invention belongs to the technical field of truck auxiliary devices, and relates to a convey device for goods in a vehicle compartment.

Related Art

Figure 1:
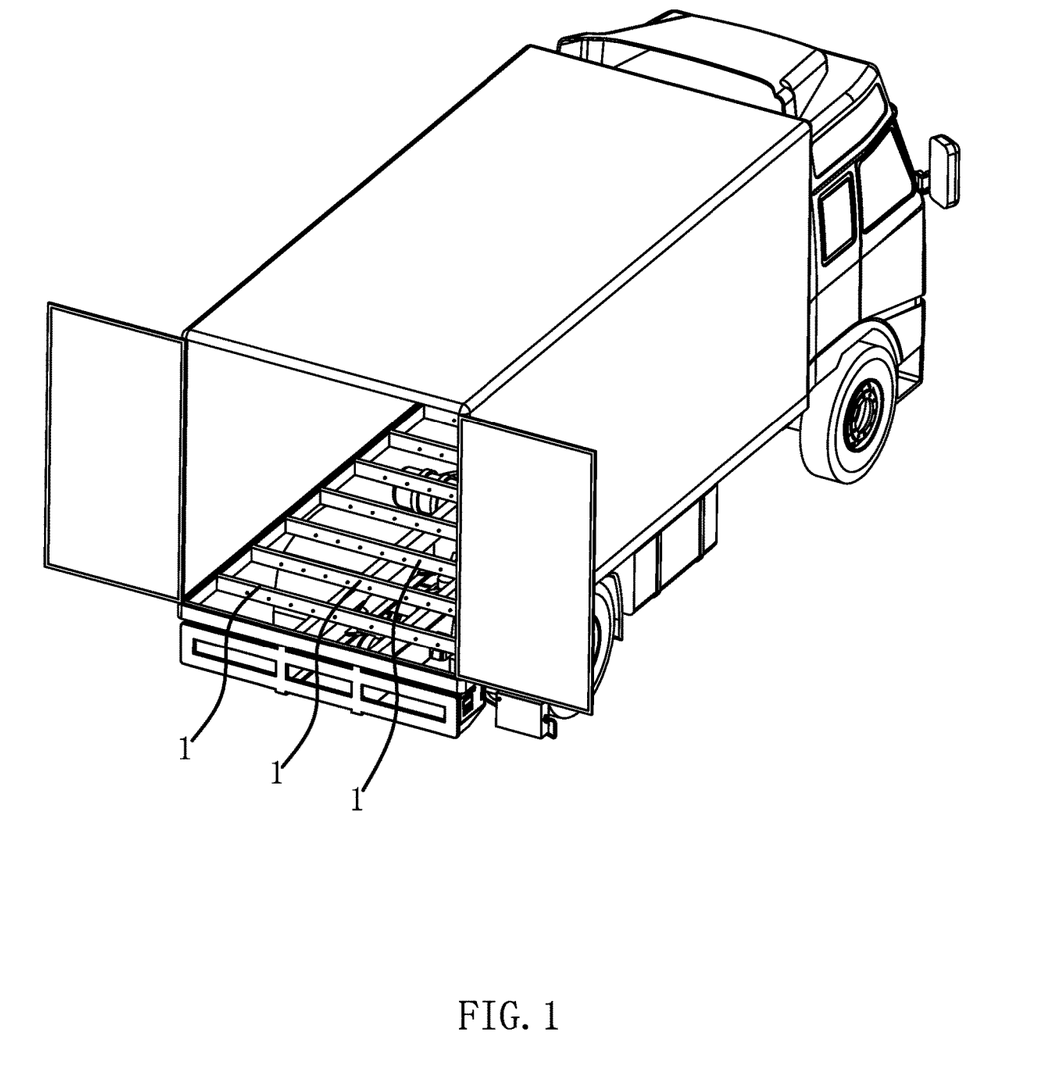
FIG. 1 is a perspective view of one embodiment of a vehicle compartment.

The current truck compartment is usually a standardized structure, as shown in FIG. 1, including a compartment, a plurality of floor beams 1 are fixedly connected to a bottom surface of the compartment, a length direction of the floor beam 1 is disposed along the direction of a width of the compartment, and a gap is disposed between every pair of the adjacent floor beams 1. When goods are placed, sleepers are usually placed on the floor beams 1, a length of the sleeper is set along a longitudinal direction of the compartment, and then a floor board is laid on the sleepers, and the goods are placed on the floor board. However, when the truck is loading with the goods, currently forklift is usually used to place the goods on the edge of the floor board of the compartment. Especially for container trucks, the goods need to be loaded from the door and placed on the floor board of the compartment near the door. Since the floor board of the compartment is a flat board and the sliding friction is large, it is laborious and difficult to move and position the large and heavy goods on the floor board.

In view of the above problem, U.S. Patent No. US2006/0182577A1 discloses a convey device for goods in a vehicle compartment, wherein sleepers are laid on floor beams of the vehicle compartment, a floor board is laid on the sleepers, and the convey device for goods includes support frames and airbags and roller frames disposed in the support frames. The support frames directly abut on an upper side of the floor board, and splice plates are laid by both sides of each of the support frames to position the support frames and support the goods after the roller frames are lowered. However, the convey device for goods is directly laid on the upper side of the floor board, the sleepers, and the floor board and the support frames all have a certain height, so the structure reduces the height of the transport space in the vehicle compartment, thereby occupying the transport space of the vehicle compartment.

SUMMARY OF THE INVENTION

One object of one embodiment of the present invention is to solve the above problems in the prior art by providing an auxiliary convey mechanism for goods in a vehicle compartment, and the auxiliary convey mechanism for goods in the vehicle compartment has higher structural stability while without occupying the transport space of a truck.

One object of the present invention can be achieved by the following technical solutions: an auxiliary convey mechanism for goods in a vehicle compartment, comprising a plurality of elongated splice plates on floor beams of the vehicle compartment, a plurality of elongated surface boards, a plurality of support frames, a plurality of conveying assemblies and a plurality of avoidance gaps, each of the surface boards is fixedly connected with several support frames along a length direction of a surface board of the surface boards, each of the conveying assemblies comprising a lifting frame and rollers rotatably connected on the lifting frame, wherein each of the surface boards is fixedly connected between two adjacent splice plates of the splice plates along a length direction of a splice plate of the splice plates, the avoidance gaps are formed between ends of two adjacent support frames of the support frame along a length direction of a surface board of the surface boards, the avoidance gaps are capable of accommodating insertion of the floor beams, when the floor beams are inserted in the avoidance gap, the support frames are inserted between the two adjacent floor beams of the floor beams, each of the conveying assemblies is correspondingly disposed in each of the support frames, each of the surface boards bent along a width direction of a surface board of the surface boards to have a corrugated shape.

One embodiment of the splice plates are laid on the floor beams of the vehicle compartment, and the floor beams of the vehicle compartment are capable of inserting in the avoidance gaps, so that the support frames are capable of inserting in floor gaps, and the support frames do not occupy the transport space of the truck. Therefore, the truck still has a larger height of the transport space after installing the auxiliary convey mechanism. An airbag is disposed in the support frame, when the airbag is inflated to lift the rollers upwards, the goods are pressed against the rollers, so the support frame needs to bear the weight of the goods. The support frames are fixedly connected on the surface board, and the surface board is bent to have a corrugated shape, compared with a flat plate structure, the corrugated shaped surface board has higher structural strength, and is capable of avoiding deformation due to supporting the weight of the goods, so that the auxiliary convey mechanism has higher structural stability while without occupying the transport space of the truck.

In one embodiment of the above-mentioned auxiliary convey mechanism for goods in the vehicle compartment, each of the surface boards is bent concavely and convexly to form a plurality of downwardly protruding stiffeners, a length direction of each of the stiffeners is the same as the length direction of each of the surface boards, each of the support frames is elongated, a cross section of each of the support frames is U-shaped, and two edges of each of the support frames are respectively fixedly connected on lower end face of two adjacent stiffener of the stiffener. The stiffeners formed by bending are capable of improving the structural strength of the corresponding surface board, and the length direction of each of the stiffeners is the same as the length direction of each of the surface boards, thereby improving the bending resistance of the surface boards in the length direction. Wherein each of the stiffener is a plate-shaped bending structure that needs to bear an acting force of the corresponding support frame; at this time, if the stiffener protrudes upward, the plate-shaped stiffener is likely to be bent and deformed or inclined and deformed toward the side after being subjected to the acting force. Since each of the stiffener is downwardly protruded, the plate-shaped stiffener is subject to a downward pulling force of the corresponding support frame, and the stiffener does not undergo bending deformation or inclined deformation to the side, so that the structure is more stable.

In one embodiment of the above-mentioned auxiliary convey mechanism for goods in the vehicle compartment, two side edges of each of the surface boards are bent to form connection flanges connected to the stiffeners, each of the connection flanges is fixedly connected to an edge of an adjacent splice plate of the splice plates, and the edge of each of the support frame is fixedly connected on the lower end face of an adjacent splice plate of the splice plates, which is connected to an adjacent connection flange of the adjacent connection flanges. Each of the surface boards is supported on the adjacent splice plates through the connection flanges, and each of the stiffeners connected to the adjacent support frame is directly connected with the adjacent splice plate, so that a load received by each of the stiffener is capable of being directly transmitted to the adjacent splice plate, and a force received by a middle of each of the surface board along the width direction is reduced, thereby improving the structural stability of each of the surface boards.

In one embodiment of the above-mentioned auxiliary convey mechanism for goods in the vehicle compartment, a lower side of each of the connection flanges is abutted against and fixedly connected to an edge of an upper side of the adjacent splice plate. Each of the connection flanges is directly hung on the adjacent splice plate to make the installation more convenient, and each of the connection flanges is in surface contact with the adjacent splice plate, so that each of the connection flanges is subject to force evenly and the overall stability is high.

In one embodiment of the above-mentioned auxiliary convey mechanism for goods in the vehicle compartment, an upper side of each of the connection flanges is flush with an upper side of each of the surface boards. If the upper side of each of the surface boards is higher than the upper side of each of the connection flanges, the transport space of the truck will be occupied. If the upper side of each of the surface boards is lower than the upper side of each of the connection flanges, each of the surface board forms a stress concentrated area at the sinking middle, and the load of each of the support frame is excessively transmitted to the middle of the corresponding surface board, which easily causes deformation of the surface boards.

In one embodiment of the above-mentioned auxiliary convey mechanism for goods in the vehicle compartment, each of the stiffener has a flat and straight bottom and two vertical side portions, each of the edges of each of the support frames has a connector, each of the connectors has a flat and straight upper end face, and the upper end face of each of the connectors is abutted against and fixedly connected with the lower end face of the bottom of the adjacent stiffener. The vertical side portions are capable of withstanding a larger pulling force, and the upper end face of each of the connectors is fitted with and abutted against the lower end face of the adjacent stiffener, so that the upper end face of each of the connector functions to position and hold the lower end face of the adjacent stiffener, and to improve the structural stability of the stiffener.

In one embodiment of the above-mentioned auxiliary convey mechanism for goods in the vehicle compartment, each of the lifting frames is elongated, two rows of the rollers are rotatably connected on the corresponding lifting frame, each row of the rollers is arranged along a length direction of the corresponding lifting frame, and each of the surface boards has at least one of the stiffeners between the two rows of rollers. One side of the roller is connected with the stiffener of the support frame, so that the stiffener is also disposed between the two rows of rollers, and both sides of the roller have the stiffener to improve the overall stability of the surface board.

In one embodiment of the above-mentioned auxiliary convey mechanism for goods in the vehicle compartment, there are three stiffeners on each of the surface boards, each of the surface boards has one row of openings between every pair of the adjacent stiffeners, inside each of the support frames is further disposed with an airbag under the lifting frame, and when each of the airbags is inflated and lifts the corresponding lifting frame upwards, an upper portion of each of the rollers is capable of protruding outside the corresponding opening. The overall structure is made symmetrical, the force received is uniform, and the roller is located between the two adjacent stiffeners, thereby making the structure compact.

In one embodiment of the above-mentioned auxiliary convey mechanism for goods in the vehicle compartment, each of the lifting frames comprises a bottom plate and two side plates formed by bending upwardly from two edges of the bottom plate, an upper side of each of the bottom plates further has two rows of support plates, each of the rollers is rotatably connected between an adjacent side plate of the side plates and an adjacent support plate of the support plates through a pin, when the upper portion of each of the rollers protrudes outside the corresponding opening, two ends of the pin abut against an outer side surface of the side portion of the two adjacent stiffeners respectively. When the upper portion of the roller protrudes outside the opening to support the goods, the two ends of the pin abut against the side portions of the two adjacent stiffeners, thereby supporting the side portions of the two stiffeners to improve the structural stability of the stiffeners.

In one embodiment of the above-mentioned auxiliary convey mechanism for goods in the vehicle compartment, the stiffeners on each of the surface boards are evenly arranged along the width direction of the corresponding surface board. Uniform reinforcement of the structural strength of the surface board avoids weak local strength to become an initiation point of deformation.

Compared with the prior art, one embodiment of the auxiliary convey mechanism for goods in the vehicle compartment has the following advantages:

1. Since the splice plates are laid on the floor beams of the vehicle compartment, the floor beams of the vehicle compartment are capable of inserting in the avoidance gaps, so that the support frames are capable of inserting in the floor gaps, and the support frames do not occupy the transport space of the truck. Therefore, the truck still has a larger height of the transport space after installing the auxiliary convey mechanism.

2. Since each of the surface boards is bent to have a corrugated shape, compared with a flat plate structure, the corrugated shaped surface board has higher structural strength, and is capable of avoiding deformation due to supporting the weight of the goods, so that the auxiliary convey mechanism has higher structural stability.

3. Since each of the stiffeners is downwardly protruded, the plate-shaped stiffener is subject to a downward pulling force of the corresponding support frame, and each of the stiffeners does not undergo bending deformation or inclined deformation to the side, so that the structure is more stable.

DETAILED DESCRIPTION OF THE INVENTION

The technical solutions of the present invention are further described below with reference to the specific embodiments of the present invention in conjunction with the accompanied drawings, but the present invention is not limited to the embodiments.

Embodiment 1

Figure 2:
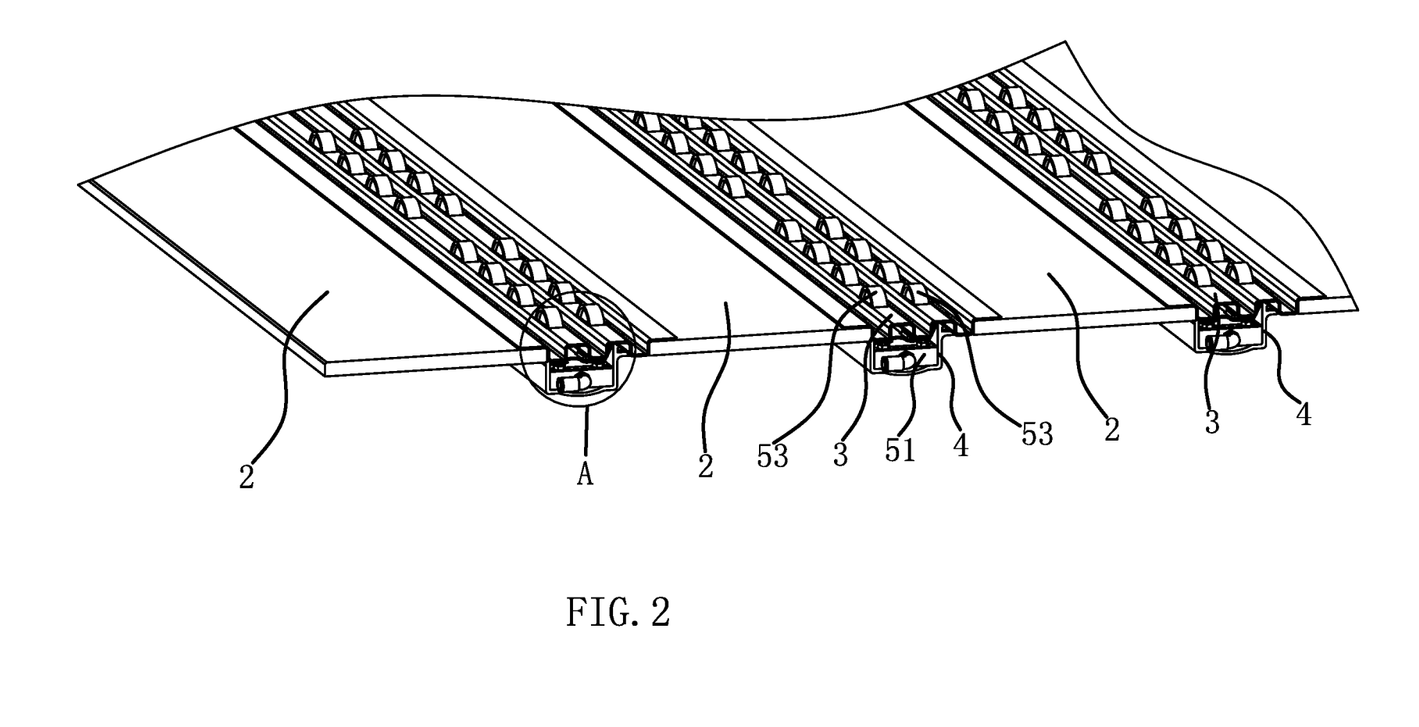
FIG. 2 is a perspective view of one embodiment of an auxiliary convey mechanism.
Figure 3:
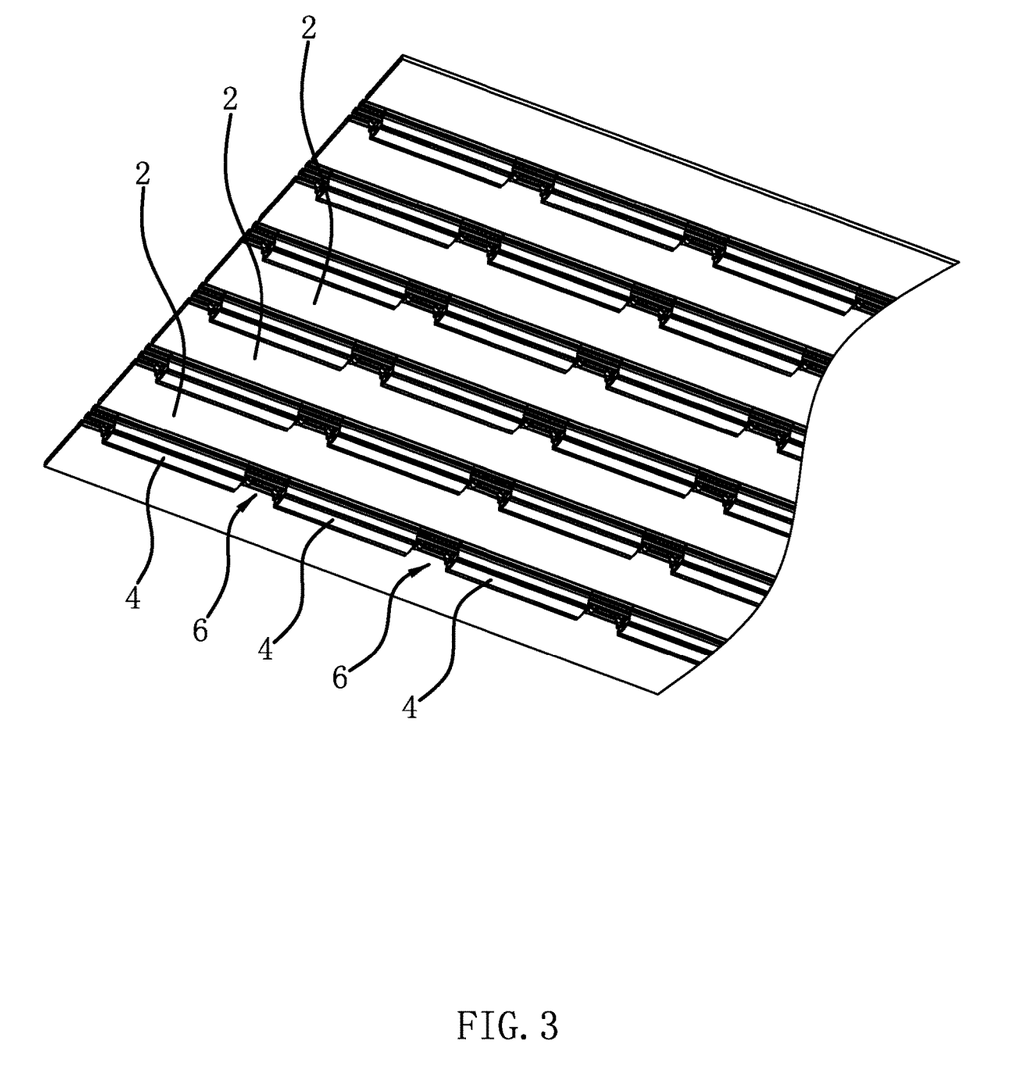
FIG. 3 is a perspective view of another viewing angle of one embodiment of the auxiliary convey mechanism.
Figure 4:
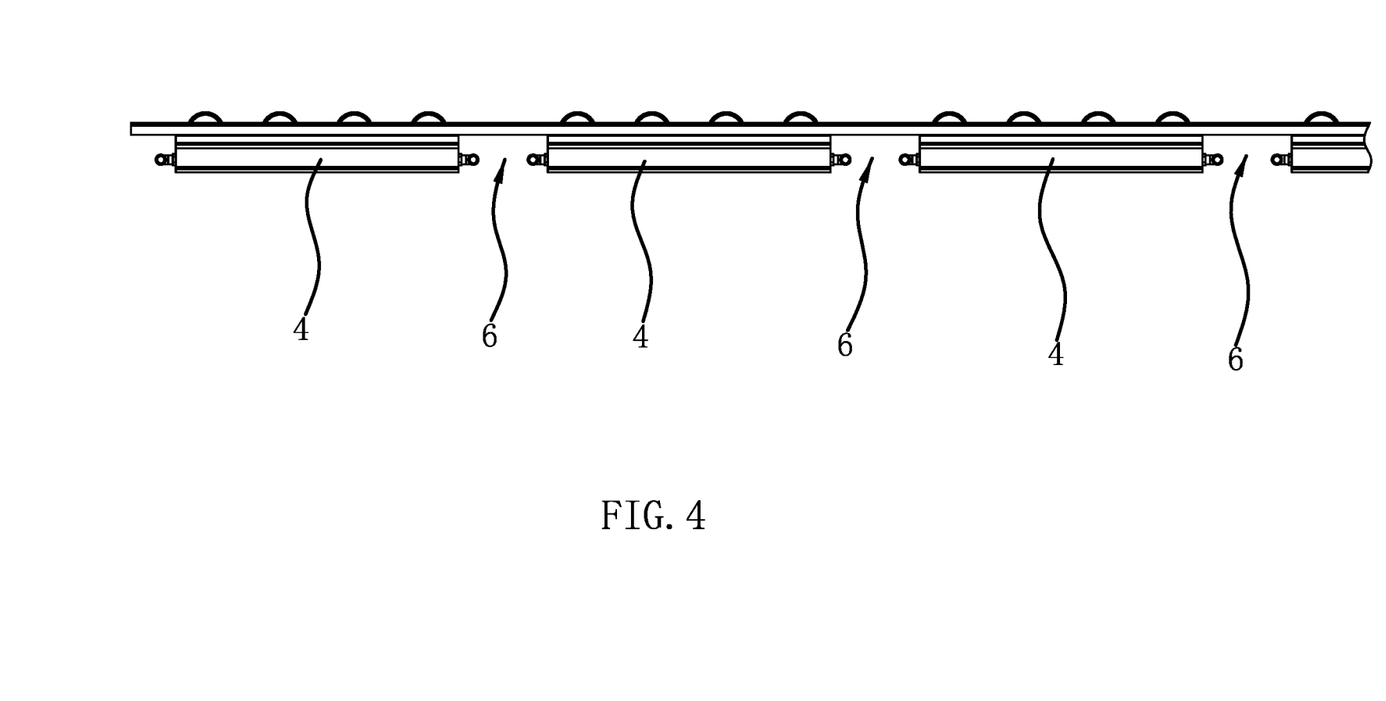
FIG. 4 is a side view of one embodiment of the auxiliary convey mechanism.

As shown in FIG. 2, FIG. 3, and FIG. 4, one embodiment of an auxiliary convey mechanism for goods in a vehicle compartment comprising a plurality of elongated splice plates 2, a plurality of elongated surface boards 3, a plurality of elongated support frames 4, a plurality of conveying assemblies 5 and a plurality of avoidance gaps 6. Each of the surface boards 3 is fixedly connected between two adjacent splice plates 2 along a length direction. The support frames 4 are fixedly connected on the corresponding surface board 3 along a length direction, and each of the support frames 4 is located below the corresponding surface board 3. An avoidance gap 6 is formed between ends of the two adjacent support frames 4 along the length direction. When in use, the splice plates 2 are laid on floor beams 1 of the vehicle compartment of a truck. At this time, the floor beams 1 of the truck are inserted in the avoidance gaps 6, and the support frames 4 are inserted in floor gaps, and the support frames 4 do not occupy the transport space of the truck. Therefore, the truck still has a larger height of the transport space after installing the auxiliary convey mechanism. Inside each of the support frames 4 is disposed with the conveying assembly 5, wherein each of the conveying assemblies 5 includes an airbag 51, a lifting frame 52 and rollers 53. The airbag 51 abuts against a bottom surface of the adjacent support frame 4, each of the lifting frames 52 is located above the corresponding airbag 51, and each of the rollers 53 are pivotally connected on the adjacent lifting frame 52. Openings 33 are disposed in the surface board 3, and therefore when each of the airbags 51 is inflated, this airbag 51 is capable of lifting the lifting frame 52 upwards, so that an upper portion of each of the rollers 53 is capable of protruding outside the corresponding opening 33 of the surface board 3, thereby lifting the goods. Since each of the support frames 4 needs to bear the weight of the goods, and each of the support frames 4 is fixedly connected on the adjacent surface board 3, each of the surface boards 3 is bent along a width direction to have a corrugated shape and higher structural strength, and is capable of avoiding deformation due to supporting the weight of the goods, and thus the auxiliary convey mechanism has higher structural stability while without occupying the transport space of the truck.

Figure 5:
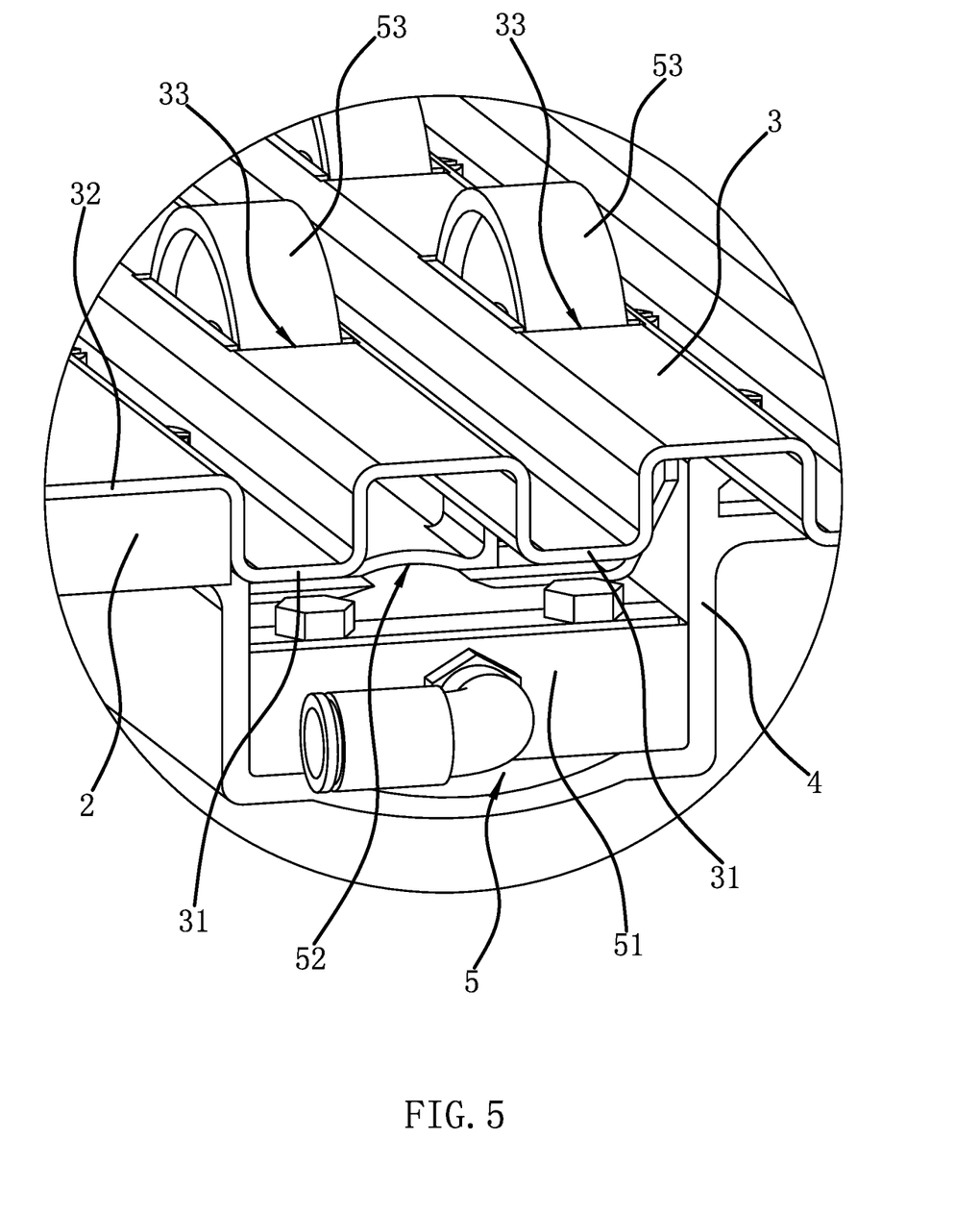
FIG. 5 is an enlarged view of Section A in FIG. 2.
Figure 6:
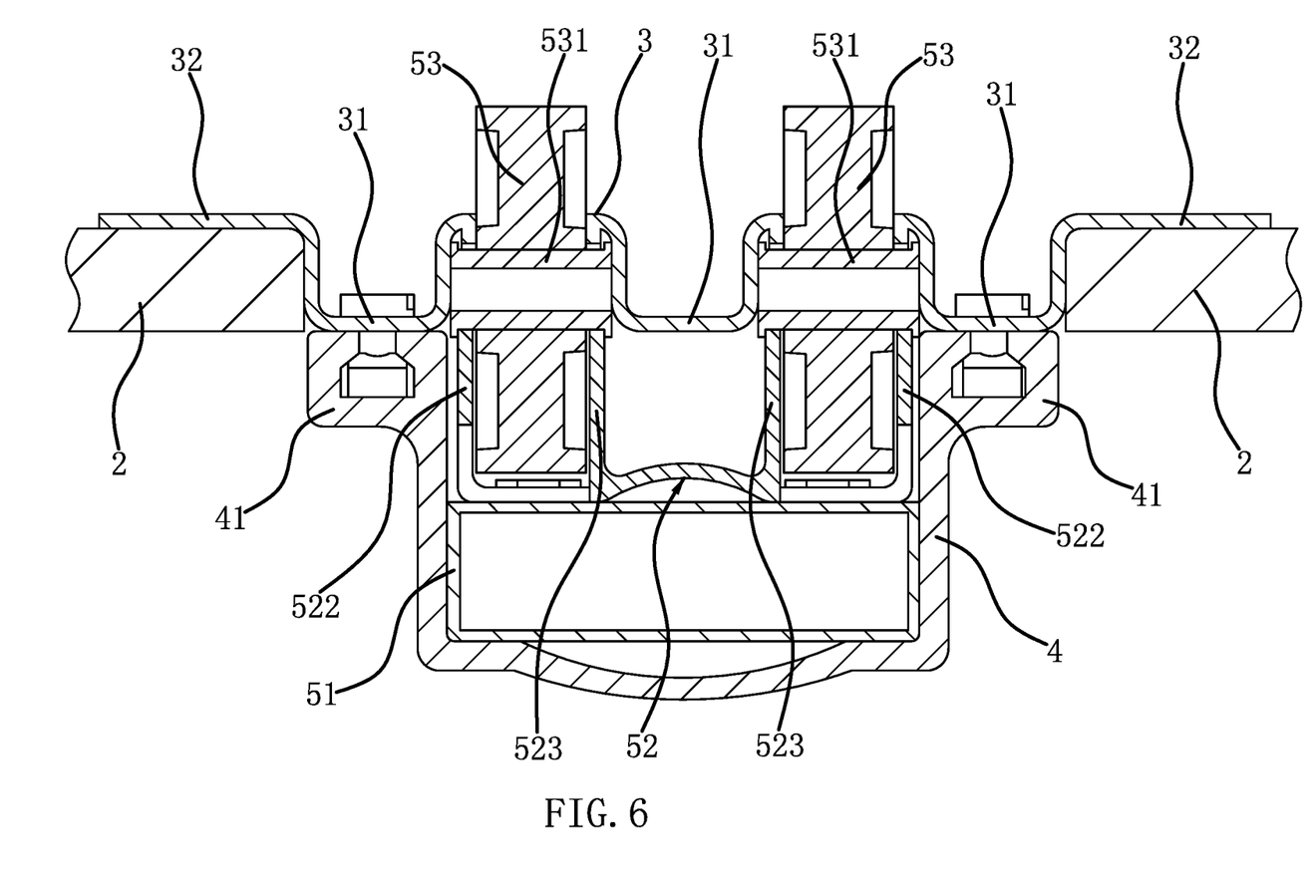
FIG. 6 is a cross-sectional view of a partial structure of one embodiment of the auxiliary convey mechanism.

Specifically, as shown in FIG. 5 and FIG. 6, one embodiment of each of the surface boards 3 is bent concavely and convexly and formed into three stiffeners 31, the stiffeners 31 are evenly arranged along the width direction of the corresponding surface board 3, and a length direction of each of the stiffeners 31 is the same as a length direction of each of the surface boards 3 in order to improve the bending resistance of each of the surface boards 3 in the length direction. Each of the stiffener 31 protrudes downwardly, and has a flat and straight bottom and two vertical side portions. Each of the support frame 4 has a U-shaped cross section. Each of edges of each of the support frames 4 has a connector 41, each of the connectors 41 has a flat and straight upper end face, and the upper end face of the connector 41 is abutted against and fixedly connected with a lower end face of a bottom of the stiffener 31. Two side edges of each of the surface boards 3 are bent to form connection flanges 32 connected to the adjacent stiffeners 31, an upper side of each of the connection flanges 32 is flush with an upper side of the adjacent surface board 3, and a lower side of each of the connection flanges 32 is abutted against an edge of an upper side of the adjacent splice plate 2, and is fixedly connected on the adjacent splice plate 2 by bolts. Each of the connector 41 of the support frame 4 is fixedly connected on the lower end face of the adjacent stiffener 31, which is connected to the adjacent connection flange 32, that is, the two connectors 41 are respectively fixedly connected to the stiffeners 31 on both sides.

Figure 7:
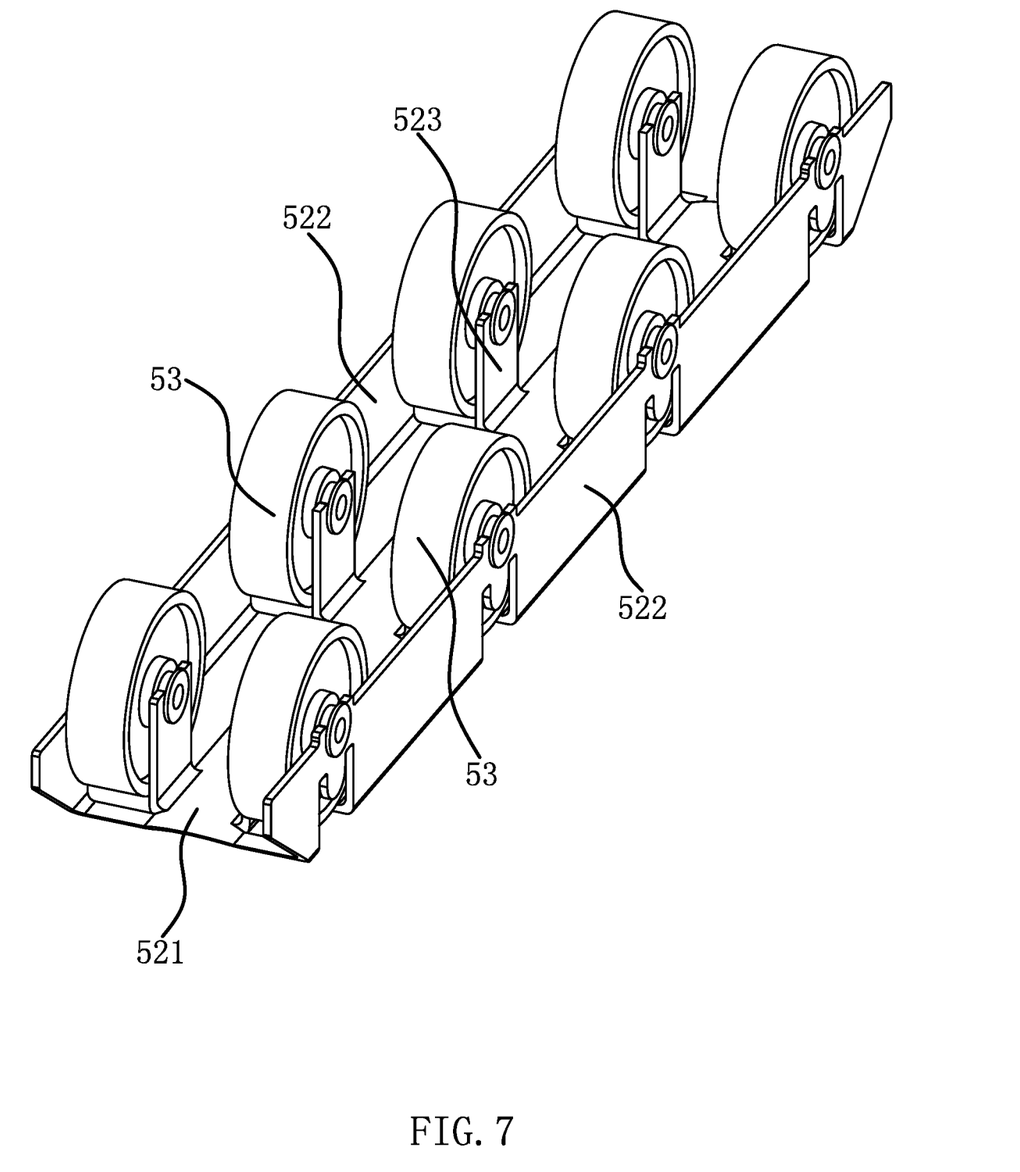
FIG. 7 is a perspective view of one embodiment of a lifting frame installed with rollers.

As shown in FIG. 7, one embodiment of the rollers 53 connected on the lifting frame 52 have two rows, each of the rows of rollers 53 is arranged along a length direction of the lifting frame 52, and the two rows of rollers 53 are respectively located between the two adjacent stiffeners 31. Each of the surface boards 3 has one row of openings 33 between every pair of the adjacent stiffeners 31. Each of the lifting frames 52 includes a bottom plate 521 and two side plates 522 which are formed by bending upwardly from two edges of the bottom plate 521, an upper side of each of the bottom plates 521 further has two rows of support plates 523, and each of the rollers 53 is rotatably connected between the adjacent side plate 522 and the adjacent support plate 523 through a pin 531. When the upper portion of each of the rollers 53 protrudes outside the opening 33, two ends of the corresponding pin 531 abut against an outer side surface of the side portions of the two adjacent stiffeners 31 respectively, thereby supporting the side portions of the two stiffeners 31 to improve the structural stability of the stiffeners 31.

Embodiment 2

Figure 8:
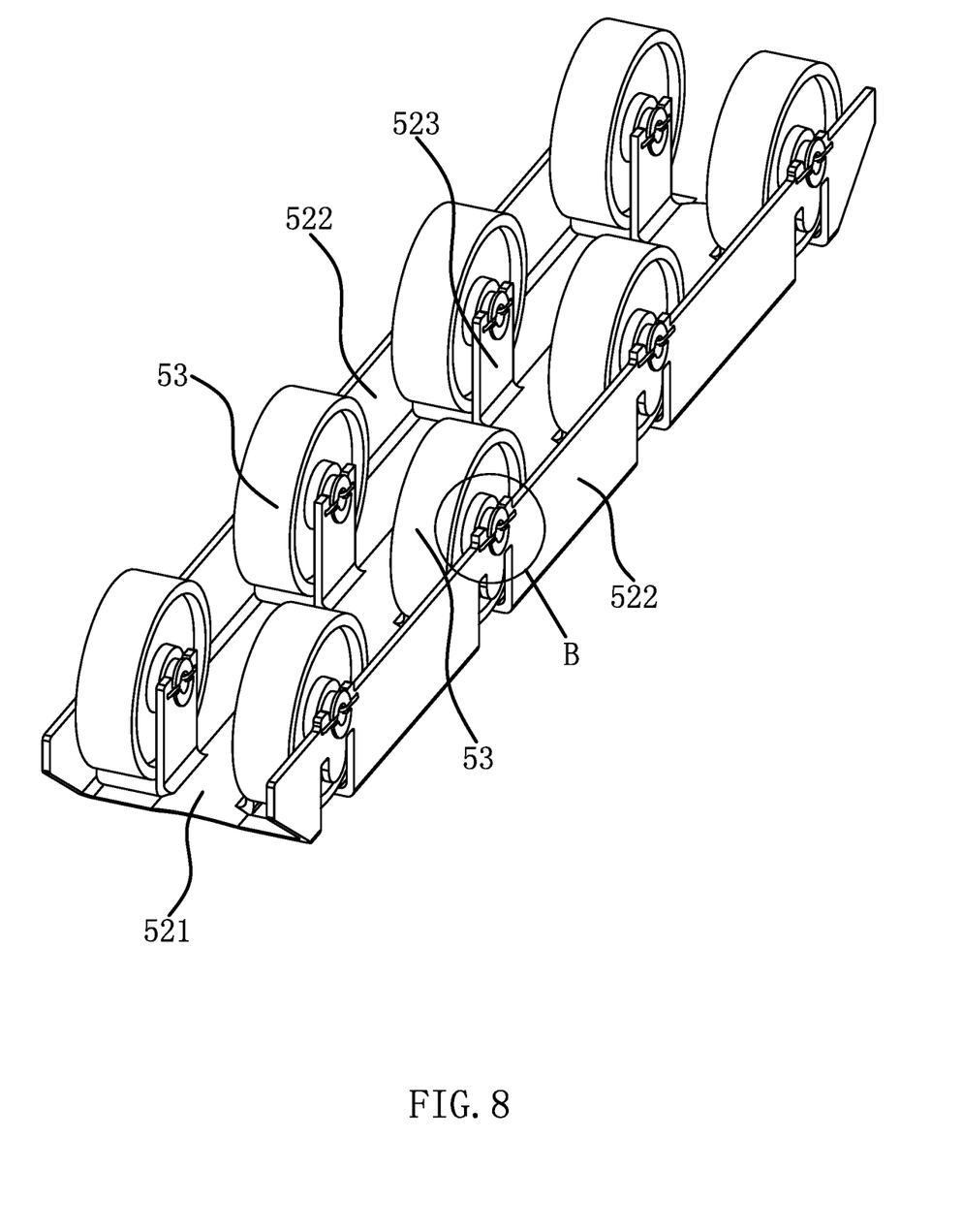
FIG. 8 is a perspective view of another embodiment of the lifting frame installed with the rollers.
Figure 9:
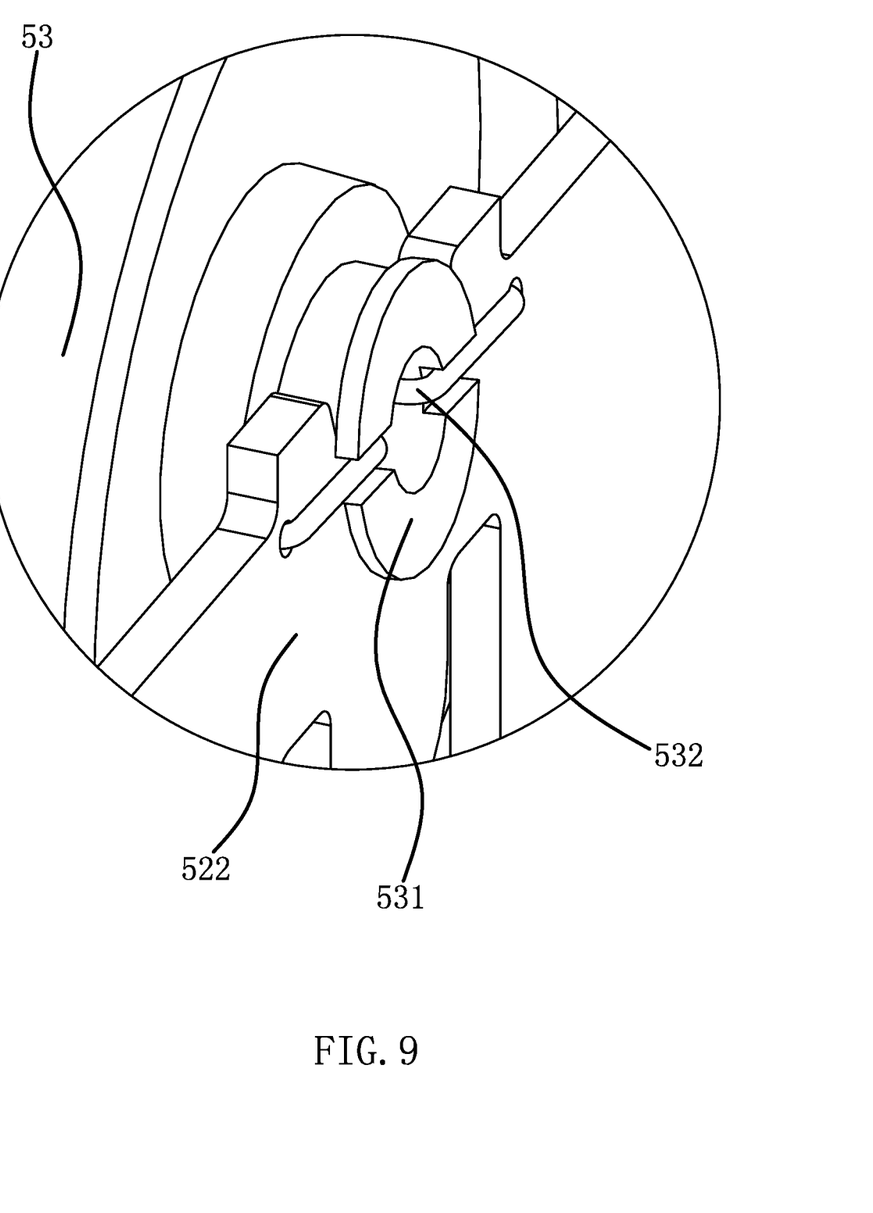
FIG. 9 is an enlarged view of Section B in FIG. 8.

The auxiliary convey mechanism for goods in the vehicle compartment is basically the same as that of the embodiment 1. As shown in FIG. 8 and FIG. 9, the differences are that each of the rollers 53 is connected between the adjacent side plate 522 and the adjacent support plate 523 through the pin 531, the pin 531 is in a tubular shape, and a strip-shaped circlip 532 is disposed in the pin 531. Both ends of each of the circlips 532 extend outside the corresponding pin 531, and one of the ends is fixedly connected on the adjacent side plate 522, and the other end is fixedly connected on the adjacent support plate 523.

The specific embodiments described herein are merely illustrative of the scope of the present invention. Technical personnel skilled in the art to which the present invention pertains can make various modifications or additions to the specific embodiments described or replace them in a similar manner, without departing from the scope of the present invention or beyond the scope defined by the appended claims.

Although the technical terms floor beam 1, splice plate 2, surface board 3, and the like are used more frequently herein, the possibility of using other technical terms is not excluded. These technical terms are merely used to describe and explain the nature of the present invention more conveniently; construing them as any additional limitation is contrary to the scope of the present invention.

LIST OF REFERENCED PARTS

1 floor beam
2 splice plate
3 surface board
31 stiffener
32 connection flange
33 opening
4 support frame
41 connector
5 conveying assembly
51 airbag
52 lifting frame
521 bottom plate
522 side plate
523 support plate
53 roller
531 pin
532 circlip
6 avoidance gap

What is claimed is:

1. An auxiliary convey mechanism for goods in a vehicle compartment, comprising:
    a plurality of elongated splice plates, the splice plates arranged on floor beams of the vehicle compartment;
    a plurality of elongated surface boards, each of the surface boards bent along a width direction of a surface board of the surface boards to have a corrugated shape;
    a plurality of support frames; and
    a plurality of conveying assemblies, each of the conveying assemblies comprising a lifting frame and rollers rotatably connected on the lifting frame;
    wherein each of the surface boards is arranged and fixedly connected between two adjacent splice plates of the splice plates along a length direction of a splice plate of the splice plates, each of the surface boards is fixedly connected with several support frames along a length direction of a surface board of the surface boards, each of the conveying assemblies is correspondingly disposed in each of the support frames, and the rollers are capable of protruding outside the corresponding surface board; and
    wherein a plurality of avoidance gaps are formed between two adjacent support frames of the support frames, and the avoidance gaps are capable of accommodating insertion of the floor beams, and when the floor beams are inserted in the avoidance gaps, the support frames are inserted between two adjacent floor beams of the floor beams.

2. The auxiliary convey mechanism for goods in a vehicle compartment as claimed in claim 1,
    wherein a plurality of downwardly protruding stiffeners formed by concavely bending the surface boards, wherein a length direction of each of the stiffeners is the same as the length direction of each of the surface boards; and
    wherein each support frame is elongated, a cross section of each of the support frames is U-shaped, and two edges of each of the support frames are respectively fixedly connected on lower end faces of two adjacent stiffener of the stiffeners.

3. The auxiliary convey mechanism for goods in a vehicle compartment as claimed in claim 2,
    wherein connection flanges formed by bending two side edges of each of the surface boards;
    wherein each of the connection flanges is connected to an adjacent stiffener of the stiffeners, and each of the connection flanges is fixedly connected to an edge of an adjacent splice plate of the splice plates; and
    wherein a first edge of each of the supporting frames is fixedly connected on a lower end face of the adjacent stiffener, which is connected to an adjacent connection flange of the adjacent connection flanges.

4. The auxiliary convey mechanism for goods in a vehicle compartment as claimed in claim 3, wherein a lower side of each of the connection flanges is abutted against and fixedly connected to an edge of an upper side of the adjacent splice plate.

5. The auxiliary convey mechanism for goods in a vehicle compartment as claimed in claim 4, wherein an upper side of each of the connection flanges is flush with an upper side of each of the surface boards.

6. The auxiliary convey mechanism for goods in a vehicle compartment as claimed in claim 5, wherein each of the stiffeners has a flat and straight bottom and two vertical side portions, wherein the first edge of each of the supporting frames has a connector, each of the connectors has a flat and straight upper end face, wherein an upper end face of each of the connectors is abutted against and fixedly connected with a lower end face of the bottom of the adjacent stiffener.

7. The auxiliary convey mechanism for goods in a vehicle compartment as claimed in claim 2,
    wherein the lifting frame is elongated;
    wherein two rows of the rollers are rotatably connected on a corresponding lifting frame, and each row of the rollers is arranged along a length direction of the corresponding lifting frame; and
    wherein each of the surface boards has at least one of the stiffeners between the two rows of rollers.

8. The auxiliary convey mechanism for goods in a vehicle compartment as claimed in claim 7,
    wherein there are three stiffeners on each of the surface boards;
    wherein each of the surface boards has one row of openings between the two adjacent stiffeners;
    wherein inside each of the support frames is further disposed with an airbag under a corresponding lifting frame; and
    wherein when each of the airbags is inflated and lifts the corresponding lifting frame upwards, an upper portion of each of the rollers is capable of protruding outside a corresponding opening.

9. The auxiliary convey mechanism for goods in a vehicle compartment as claimed in claim 8,
    wherein the lifting frame comprises a bottom plate and two side plates formed by bending upwardly from two edges of the bottom plate;

wherein an upper side of each of the bottom plates further has two rows of support plates;

wherein each of the rollers is rotatably connected between an adjacent side plate of the side plates and an adjacent support plate of the support plates through a pin; and wherein when a upper portion of each of the rollers protrudes outside a corresponding opening, two ends of a corresponding pin abut against an outer side surface of a first side portion of the two adjacent stiffeners respectively.

10. The auxiliary convey mechanism for goods in a vehicle compartment as claimed in claim 2, wherein the stiffeners on each of the surface boards are evenly arranged along a width direction of a corresponding surface board.

11. The auxiliary convey mechanism for goods in a vehicle compartment as claimed in claim 3, wherein each of the stiffeners has a flat and straight bottom and two vertical side portions;

wherein each of the stiffeners has a flat and straight bottom and two vertical side portions, wherein the first edge of each of the supporting frames has a connector, each of the connectors has a flat and straight upper end face; and wherein an upper end face of each of the connectors is abutted against and fixedly connected with a lower end face of the bottom of the adjacent stiffener.

12. The auxiliary convey mechanism for goods in a vehicle compartment as claimed in claim 3, wherein the lifting frame is elongated, wherein two rows of the rollers are rotatably connected on a corresponding lifting frame, and each row of the rollers is arranged along a length direction of the corresponding lifting frame, wherein each of the surface boards has at least one of the stiffeners between the two rows of rollers.

13. The auxiliary convey mechanism for goods in a vehicle compartment as claimed in claim 12, wherein there are three stiffeners on each surface board;

wherein each of the surface boards has one row of openings between the two adjacent stiffeners;

wherein inside each of the support frames is further disposed with an airbag under the corresponding lifting frame; and wherein when each of the airbags is inflated and lifts the corresponding lifting frame upwards, an upper portion of each of the rollers is capable of protruding outside the corresponding opening.

14. The auxiliary convey mechanism for goods in a vehicle compartment as claimed in claim 13, wherein the lifting frame comprises a bottom plate and two side plates formed by bending upwardly from two edges of the bottom plate;

wherein an upper side of each of the bottom plates further has two rows of support plates;

wherein each of the rollers is rotatably connected between an adjacent side plate of the side plates and an adjacent support plate of the support plates through a pin; and wherein when a upper portion of each of rollers protrudes outside the corresponding opening, two ends of the corresponding pin abut against an outer side surface of a first side portion of the two adjacent stiffeners respectively.

15. The auxiliary convey mechanism for goods in a vehicle compartment as claimed in claim 3, wherein the stiffeners on each of the surface boards are evenly arranged along the width direction of the corresponding surface board.

16. The auxiliary convey mechanism for goods in a vehicle compartment as claimed in claim 4, wherein the lifting frame is elongated, wherein two rows of the rollers are rotatably connected on a corresponding lifting frame, and each row of the rollers is arranged along a length direction of the corresponding lifting frame, wherein each of the surface boards has at least one of the stiffeners between the two rows of rollers.

17. The auxiliary convey mechanism for goods in a vehicle compartment as claimed in claim 16, wherein there are three stiffeners on each surface board;

wherein each of the surface boards has one row of openings between the two adjacent stiffeners;

wherein inside each of the support frames is further disposed with an airbag under the corresponding lifting frame; and wherein when each of the airbags is inflated and lifts the corresponding lifting frame upwards, an upper portion of each of the rollers is capable of protruding outside the corresponding opening.

18. The auxiliary convey mechanism for goods in a vehicle compartment as claimed in claim 17, wherein the lifting frame comprises a bottom plate and two side plates formed by bending upwardly from two edges of the bottom plate;

wherein an upper side of each of the bottom plates further has two rows of support plates;

wherein each of the rollers is rotatably connected between an adjacent side plate of the side plates and an adjacent support plate of the support plates through a pin; and wherein when a upper portion of each of the rollers protrudes outside the corresponding opening, two ends of the corresponding pin abut against an outer side surface of a first side portion of the two adjacent stiffeners respectively.

19. The auxiliary convey mechanism for goods in a vehicle compartment as claimed in claim 4, wherein each of the stiffeners has a flat and straight bottom and two vertical side portions;

wherein the first edge of each of the supporting frames has a connector, each of the connectors has a flat and straight upper end face; and wherein an upper end face of each of the connectors is abutted against and fixedly connected with a lower end face of the bottom of the adjacent stiffener.

20. The auxiliary convey mechanism for goods in a vehicle compartment as claimed in claim 4, wherein the stiffeners on each of the surface boards are evenly arranged along the width direction of the corresponding surface board.

* * * * *